United States Patent [19]

Alexoff

[11] Patent Number: 4,799,412
[45] Date of Patent: Jan. 24, 1989

[54] METHOD FOR SEVERING THE ENDS OF TUBING

[75] Inventor: Randall L. Alexoff, Youngstown, Ohio

[73] Assignee: George A. Mitchell Company, Youngstown, Ohio

[21] Appl. No.: 918,143

[22] Filed: Oct. 14, 1986

[51] Int. Cl.[4] .............................................. B23D 21/14
[52] U.S. Cl. ................................... 83/54; 83/180; 83/181; 83/185; 83/190; 83/191; 82/47; 82/82; 30/103
[58] Field of Search ............... 83/185, 191, 180, 181, 83/188, 190, 195, 54; 82/47, 82, 101; 30/103, 105

[56] References Cited

U.S. PATENT DOCUMENTS

| | | | |
|---|---|---|---|
| 2,347,808 | 5/1944 | Brehm | 83/185 |
| 3,611,853 | 10/1971 | Finsterwalder | 83/185 |
| 3,839,931 | 10/1974 | Herpich | 82/82 |
| 4,003,279 | 1/1977 | Carmichael et al. | 83/199 |
| 4,601,223 | 7/1986 | Choby | 82/82 |

FOREIGN PATENT DOCUMENTS 705197  3/1965  Canada ........................... 83/191

Primary Examiner—Donald R. Schran
Assistant Examiner—Eugenia A. Jones
Attorney, Agent, or Firm—Clifford A. Poff; Thomas H. Murray

[57] ABSTRACT

Method for severing the ends of tubing by feeding the end of a tube through a die such that its end to be sheared extends beyond the die while presenting a shear blade with a pointed end in the interior of the tube end. After the shear blade is inserted into the tube, relative vertical movement between the shear blade and the tube is effected to cause the pointed end to initially puncture the tube wall adjacent the die. The shearing blade is thereafter shifted laterally and vertically to shear remaining portions of the tube wall.

8 Claims, 4 Drawing Sheets

METHOD FOR SEVERING THE ENDS OF TUBING

BACKGROUND OF THE INVENTION

While not limited thereto, the present invention has particular utility in combination with apparatus for forming internal threads on the ends of tubing. After the end of the tube has been expanded, a threaded mandrel is inserted therein and a die is thereafter forced over the end of the tube. In this process, which is essentially a cold extrusion process, the die, as it is forced over the end of the tube, causes its inner periphery to conform to the threads on the mandrel. This is followed by rotation and removal of the mandrel from the tube end, leaving the cold-formed internal threads intact.

In this process, and as the die is forced over the mandrel, the resulting extrusion effect elongates the tube and forms a variable length flashing on its end. This flashing must be removed subsequently in a shearing process without deforming the tube end itself.

While the invention is useful in a threading operation as described above, it will be understood that it also has application to any manufacturing operation where it is necessary to shear off the end of a tube without deforming the same.

SUMMARY OF THE INVENTION

In accordance with the present invention, a new and improved method is provided for shearing an end from tubing without deforming the same, the method being particularly adapted for use with a cold-forming threading operation as described above. Specifically, the method of the invention comprises feeding the end of a tube through a die such that its end to be sheared extends beyond the die. At the same time, a shear blade with a pointed end is presented within the interior of the tube end. Relative vertical movement between the shear blade and the tube is then effected to cause the pointed end to initially puncture the tube wall adjacent the die. Thereafter, the shear blade is shifted laterally and downwardly to shear a remaining portion of the tube wall.

In the preferred embodiment of the invention, the shear blade is arcuate in configuration except at said pointed end, and the shear blade is initially moved vertically to cause the pointed end to puncture the tube wall, the shear blade being thereafter shifted laterally and downwardly to complete severing of a 180 degree segment of the tube. Following these steps, the shear blade is moved upwardly and displaced about the other 180 degree segment whereby its arcuate surface will complete shearing of the tube along the remaining 180 degree segment of the tube.

In another embodiment of the invention, the shear blade is generally diamond shaped and initially moves upward to force a first pointed end through approximately a 90 degree arc on the periphery of the tube. Thereafter, it is moved downwardly whereby a second pointed end shears a diametrically opposite 90 degree arcuate portion of the tube. The shear blade is then moved downwardly and laterally in both directions to shear the remaining 90 degree arcuate portions of the tube.

The above and other objects and features of the invention will become apparent from the following detailed description taken in connection with the accompanying drawings which form a part of this specification and in which:

FIGS. 1A, 1B and 1C schematically illustrate the manner in which internal threads can be cold-formed on the end of a tube, the process being shown in FIGS. 1A, 1B and 1C being particularly adapted for use with the present invention;

Figure 1A:
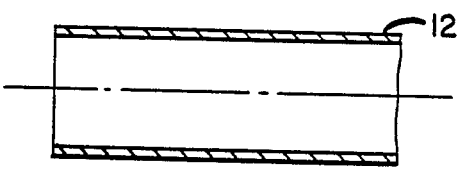
Figure 1B:
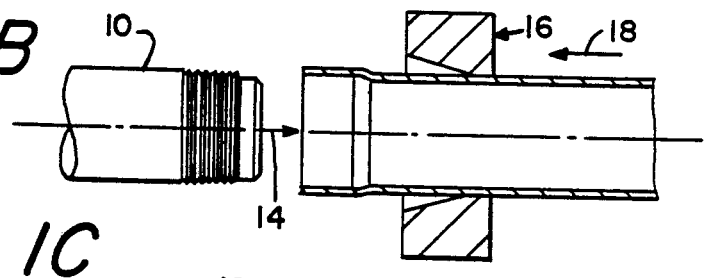
Figure 1C:
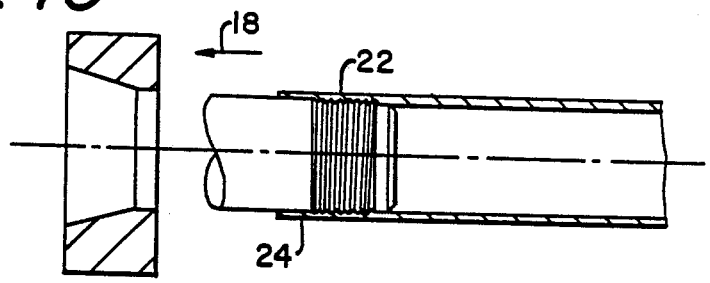

With reference now to the drawings, and particularly to FIGS. 1A, 1B and 1C there is shown a method, generally known in the art, for forming internal threads on the interior of tubing wherein a threaded mandrel 10 is inserted into the end of a tubular workpiece 12 along the direction of arrow 14 once the end of the tube has been expanded. After the mandrel 10 is inserted into the end of workpiece 12, a die 16 is forced over the end of the tubular workpiece 12 along the direction of arrow 18. Since the diameter of the die 16 is less than that of the expanded end of the tubular workpiece 12, but greater than that of the mandrel 10, the expanded end of the tube is forced inwardly and onto the mandrel 10, whereby the end of the tube is reduced in diameter as shown in FIG. 1C. At the same time, its inner periphery is forced onto the threads of the mandrel 10, thereby forming internal threads on the workpiece 12 as shown in FIG. 1C. Thereafter, the mandrel is unthreaded from the end 22 of the workpiece 12, while leaving internal threads therein. This process is particularly adapted for use in forming tubular shells for automotive shock absorbers; however, it also has other applications.

As the die 16 is forced over the end of the tubular workpiece 12 to reduce the diameter of its expanded end and form internal threads thereon, the tube end extrudes outwardly and to the left as shown in FIG. 1C, thereby forming a flashing 24 of variable length which must be subsequently removed.

Figure 2:
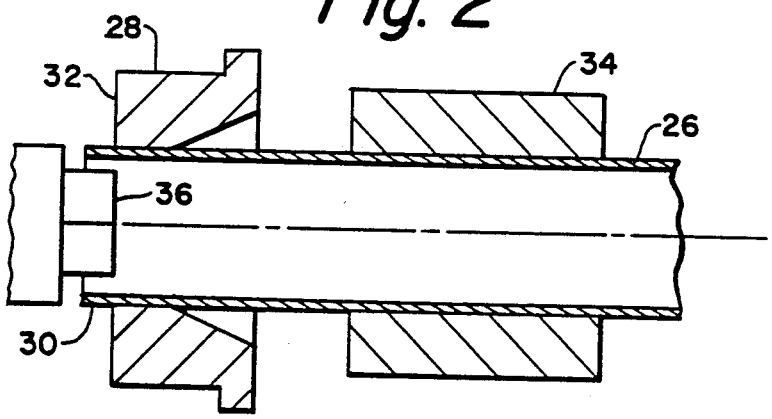
FIG. 2 is a schematic side view of typical apparatus for shearing tube ends in accordance with the teachings of the invention.

In FIG. 2, one embodiment of the shearing apparatus of the present invention is shown. Initially, the workpiece 26, shown without internal threads, is forced through a die 28 such that the flashing or end to be removed projects beyond the end face 32 of the die 28. Workpiece 26 is clamped in place by means of separable clamp jaws 34; and the shearing blade 36 is inserted into the tubular workpiece such that its forward end is slightly behind the forward end face 32 of the die 28.

Figure 3A:
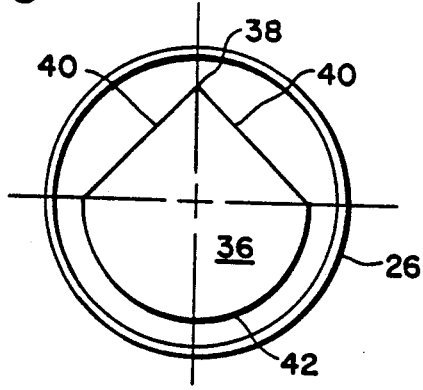
FIGS. 3A-3G are end views showing the manner in which tube ends are sheared in accordance with one embodiment of the present invention.
Figure 3B:
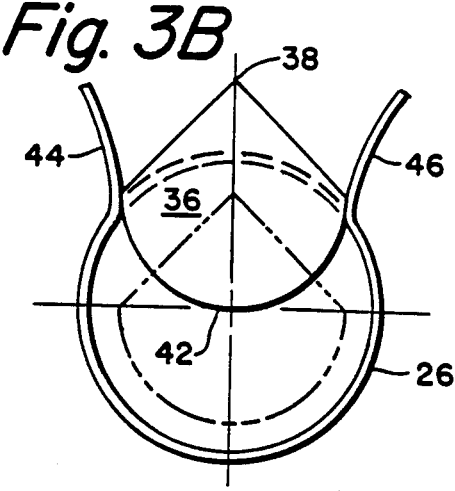
Figure 3C:
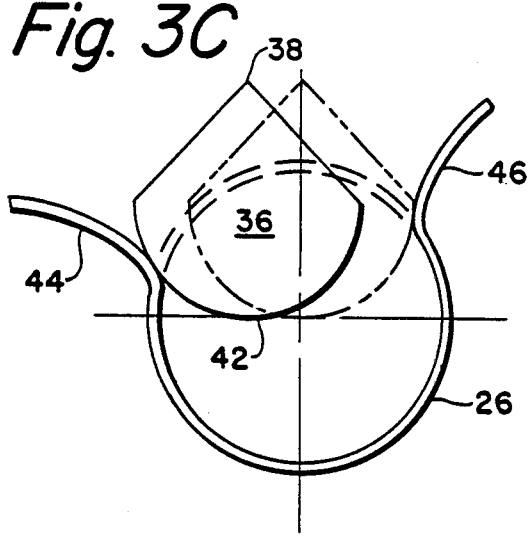
Figure 3D:
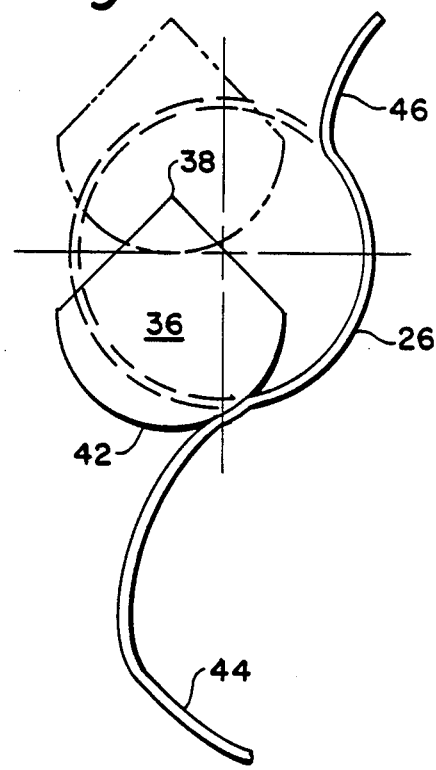
Figure 3E:
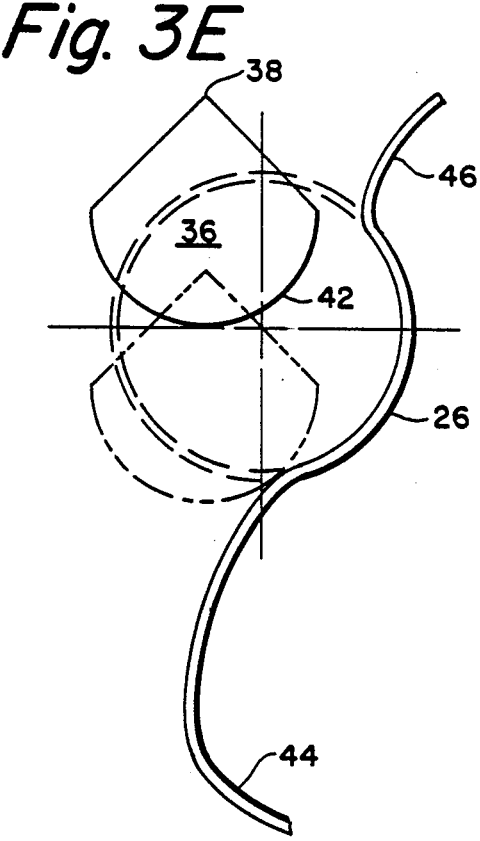
Figure 3F:
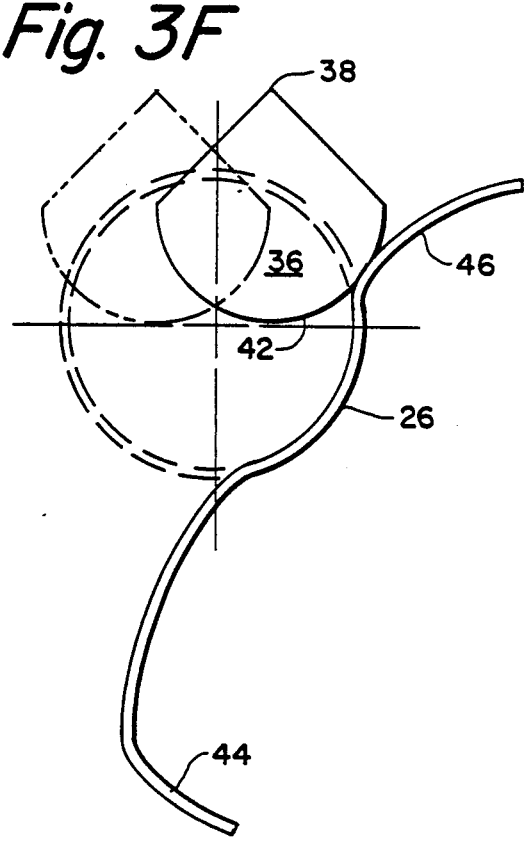
Figure 3G:
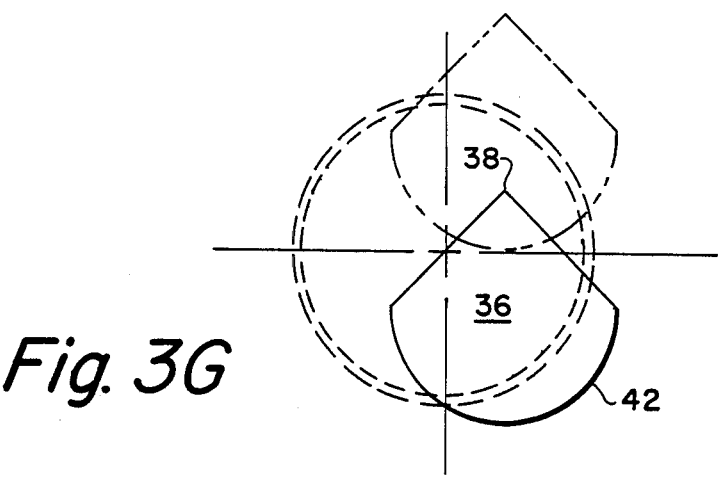

With reference to FIGS. 3A-3G, it can be seen that in the particular embodiment of the invention shown, the shear 36 is provided with inclined shearing surfaces 40 which extend downwardly at angles of about 45 degrees from an upper point 38. The lower portion of the blade 36 is identified by the reference numeral 42 and is generally semicircular in configuration. The shearing operation starts by moving the blade 36 upwardly as viewed in FIGS. 3A-3B. In this process, the point 38 punctures the tube wall, cutting away ears 44 and 46 which project outwardly and away from the tube. Following upward movement of the blade, it is then shifted laterally to the left as shown in FIG. 3C and is then moved downwardly as shown in FIG. 3D. In this process, less than one half of the tube is sheared by the lower semicircular shearing edge 42. Following the step shown in FIG. 3D, the shearing blade 36 is moved upwardly in FIG. 3E and then to the right as shown in FIG. 3F. The final step of the process is a downward movement of the shearing blade 36 to shear the remaining portion of the tube as shown in FIG. 3G, the sheared portion of the tube being generally an inverted U-shaped section 48 as shown in FIG. 3G. Following the steps shown in FIG. 3G, the shearing blade 36 is then moved into the position shown in FIG. 3A.

Figure 4:
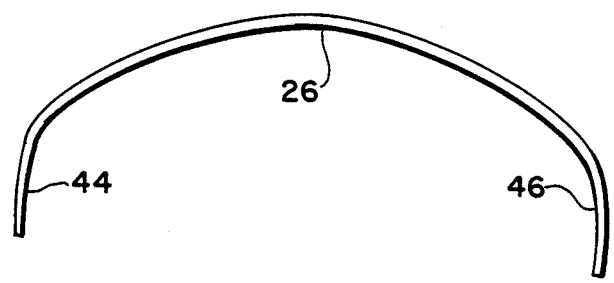
FIG. 4 illustrates a hydraulic cylinder arrangement for actuating the shearing blade to accomplish the shearing operation in FIGS. 3A-3G.
Figure 4:
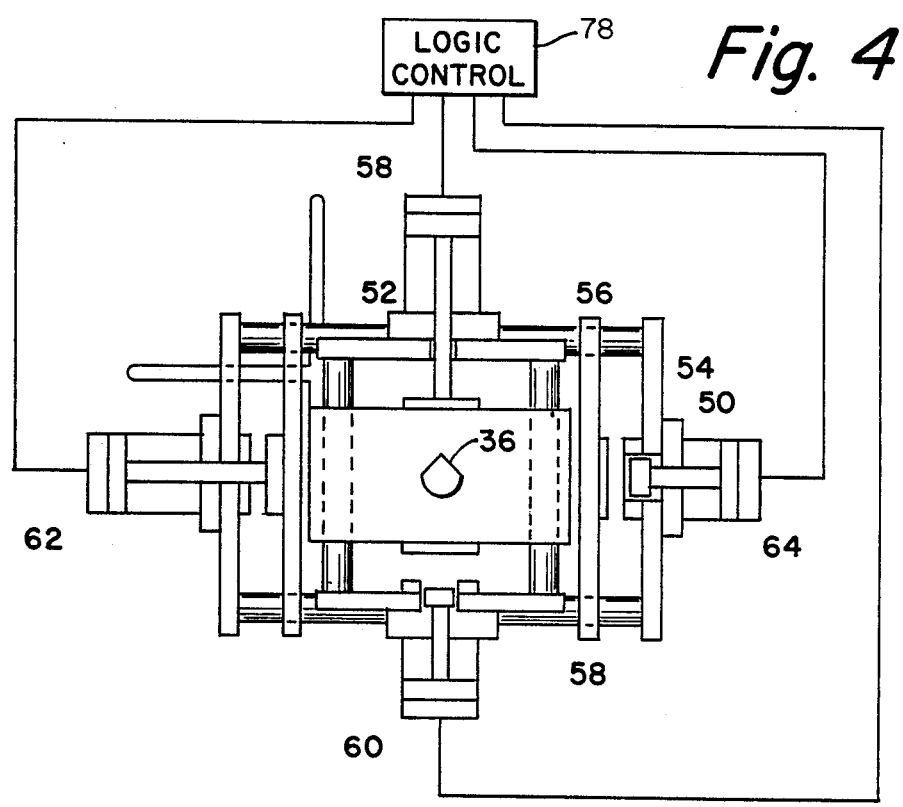

Typical apparatus for moving the shearing blade 36 is shown in FIG. 4. The shearing blade is carried on a crosshead 50 mounted for vertical reciprocal movement on shafts 52 and 54 and for transverse or lateral movement on shafts 56 and 58. Engageable with the crosshead 50 are two vertical hydraulic cylinders 60 and 62 and two horizontal cylinders 64 and 66. The cylinders 60-66, in turn, are connected through suitable hydraulic circuitry to hydraulic logic circuitry 78 to effect the movements schematically illustrated in FIGS. 3A-3G.

Figure 5A:
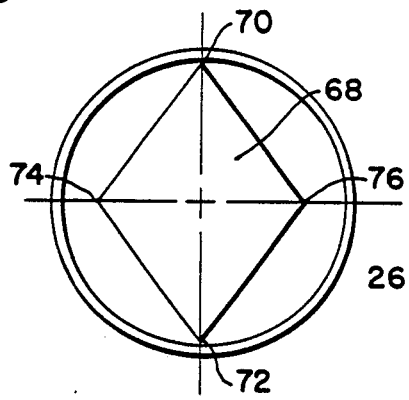
FIGS. 5A-5F schematically illustrate another embodiment of the invention wherein a shearing blade of different configuration is utilized than that shown in FIGS. 3A-3G.
Figure 5B:
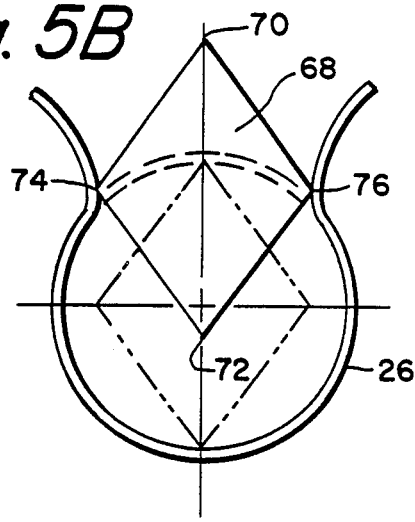
Figure 5C:
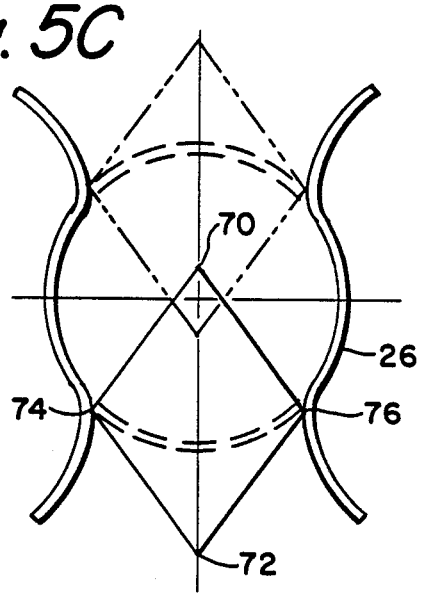
Figure 5D:
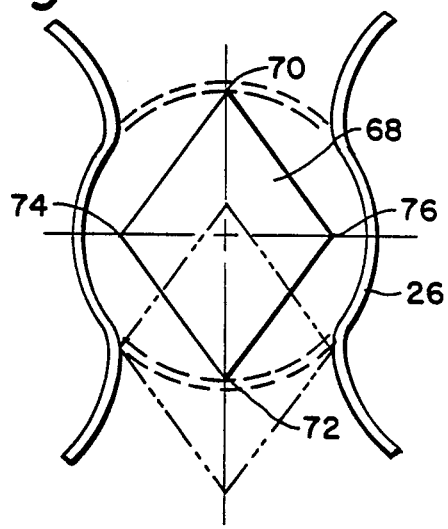
Figure 5E:
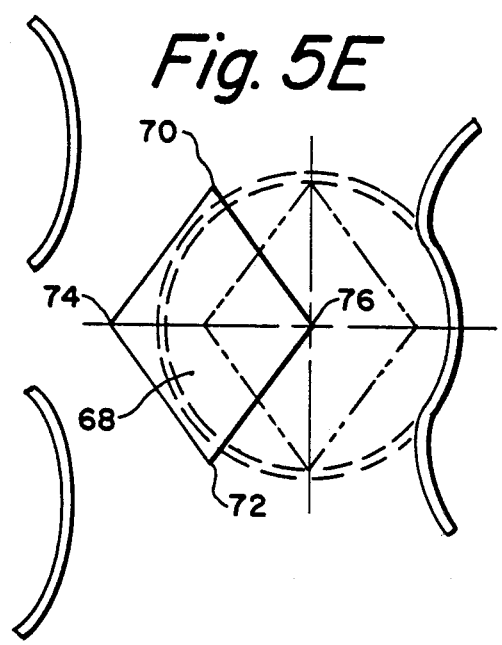
Figure 5F:
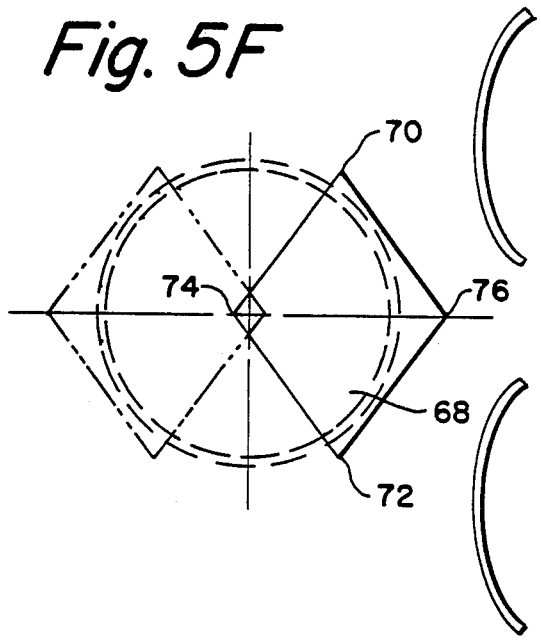

Another embodiment of the invention is shown in FIGS. 5A-5F, it being understood that the tube is again inserted into a die such as die 28 shown in FIG. 2 and clamped by jaws 34. In this case, the shearing blade 68 is diamond shaped in configuration and has upper and lower pointed ends 70 and 72 as well as diametrically opposite side pointed ends 74 and 76. In this embodiment of the invention, the shearing blade is initially inserted into the tube as before and is thereafter moved upwardly as shown in FIG. 5B to shear the upper portion of the tube, in much the same way as in the previous embodiment. Thereafter, the shearing blade 68 is moved downwardly to shear the bottom of the tube as shown in FIG. 5C and is then moved upwardly and back into coaxial alignment with the tube 26 to be sheared. Following this procedure, the shearing blade 68 is moved to the left as viewed in FIG. 5E to completely shear one half of the tube and is thereafter moved to the right as shown in FIG. 5F to shear the other half of the tube. The operation is completed, of course, by returning the shearing blade 68 to the position shown in FIG. 5A.

Although the invention has been shown in conjunction with certain specific embodiments, it will be readily apparent to those skilled in the art that various changes in form and arrangement of parts may be made to suit requirements without departing from the spirit and scope of the invention.

I claim as my invention:

1. A method for severing the ends of tubing comprising feeding the end of a tube through a die such that the end of the tube to be sheared extends beyond the die, pressing a shear blade with a pointed end in the interior of said end of a tube, causing relative vertical movement between said shear blade and said tube to cause said pointed end to initially puncture and extend exteriorly of the tube wall adjacent said die, and thereafter shifting said shear blade from the puncture site about a tube wall shearing path generally tranverse to the length of the tube by laterally moving the shear blade from the puncture site and then vertically moving the shear blade to shear a remaining portion of the tube wall.

2. The method of claim 1 wherein said shear blade is arcuate in configuration except at said pointed end.

3. The method of claim 2 wherein said shear blade is initially moved vertically to cause said pointed end to puncture the tube wall, the shear blade being thereafter shifted laterally and downwardly to complete severing of a 180 degree segment of the tube, and the shear blade thereafter being moved upwardly and displaced about the other 180 degree segment to complete shearing of the tube along said arcuate surface.

4. A method for severing the ends of tubing comprising feeding the end of a tube through a die such that its end to be sheared extends beyond the die, presenting a shear blade with a pointed end in the interior of said tube end, moving said shear blade vertically to cause said pointed end to initially puncture the tube wall adjacent said die, thereafter shearing additional portions of the tube wall by shifting said shear blade laterally from the puncture site and then downwardly to shear a portion of the tube wall starting from the puncture produced by said pointed end, moving said shear blade vertically upwardly to a position where its pointed end extends through the puncture previously produced in the tube wall, and thereafter moving said shear blade laterally and downwardly in a direction opposite to said initial lateral movement to shear the remaining portion of the tube wall.

5. The method of claim 4 wherein said shear blade has a pointed upper end and a lower arcuate shearing surface.

6. The method of claim 4 including the step of clamping said tubing after it is fed through said die.

7. The method of claim 4 including the step of initially expanding the end of the tube thereby creating an expanded end, inserting a threaded mandrel into said expanded end of the tube, forcing a die over the expanded end to cold extrude the same while forming internal threads on the tube end, removing said mandrel, and thereafter effecting said method of shearing to remove any flashing at a desired length beyond the threads thus formed.

8. The method of claim 4 including the step of initially expanding the end of the tube thereby creating an expanded end, inserting a mandrel into said expanded end of the tube, forcing a die over the expanded end to cold extrude the same while forming a thinner wall on the tube end, removing said mandrel, and thereafter effecting said method of shearing to remove any extruded length extending beyond a desired finished length of the tube end.

* * * * *